United States Patent
Smith et al.

(10) Patent No.: US 7,222,521 B1
(45) Date of Patent: May 29, 2007

(54) METHOD AND APPARATUS FOR BRAKE ROTOR TESTING

(75) Inventors: Michael Henry Smith, Ann Arbor, MI (US); Eugene Gorbonosov, Farmington Hills, MI (US)

(73) Assignee: ETAS, Inc., Ann Arbor, MI (US)

( * ) Notice: Subject to any disclaimer, the term of this patent is extended or adjusted under 35 U.S.C. 154(b) by 0 days.

(21) Appl. No.: 11/331,379

(22) Filed: Jan. 12, 2006

(51) Int. Cl.
*G01L 5/28* (2006.01)
(52) U.S. Cl. ....................................................... 73/121
(58) Field of Classification Search .................. 73/121, 73/128, 129, 130; 340/438, 453, 454; 33/600, 33/609, 610; 188/1.11 R, 1.11 W, 1.11 L, 188/1.11 E
See application file for complete search history.

(56) References Cited

U.S. PATENT DOCUMENTS

| | | | | |
|---|---|---|---|---|
| 5,372,221 A | * | 12/1994 | Jalbert | .................... 188/1.11 L |
| 7,108,107 B2 | * | 9/2006 | Ralea et al. | ............ 188/1.11 L |
| 2002/0195298 A1 | * | 12/2002 | Borugian | .............. 188/1.11 W |
| 2003/0192747 A1 | * | 10/2003 | Borugian | ............... 188/1.11 E |

* cited by examiner

*Primary Examiner*—Eric S. McCall
(74) *Attorney, Agent, or Firm*—Merchant & Gould P.C.

(57) ABSTRACT

A system for determining a brake rotor characteristic includes test instrumentation. The test instrumentation includes at least one pair of linear variable displacement transducers placed on opposing side surfaces of a brake rotor. The brake rotor is mounted on a motor vehicle. The test instrumentation also includes a rotation detector oriented toward the brake rotor. The test instrumentation further includes a brake test controller powered by a power source of the motor vehicle and/or an internal device battery. The brake test controller is configured to acquire data from the at least one pair of linear variable displacement transducers and the rotation detector. A method for determining a brake rotor characteristic includes collecting data from the brake rotor and analyzing the data to produce test results representative of the characteristic of the brake rotor.

18 Claims, 6 Drawing Sheets

METHOD AND APPARATUS FOR BRAKE ROTOR TESTING

TECHNICAL FIELD

The present invention is directed to testing component characteristics as well as conformance to OE specifications. More specifically, the present invention is directed to a method and system for on-vehicle brake rotor wear testing and dimension measurements.

BACKGROUND

Reliable automotive braking systems are extremely important in ensuring motor vehicle safety. As such, braking systems must be designed and manufactured to extremely exacting standards. Problems with such systems, as measured or detected primarily by warranty returns, are carefully monitored for signs of correctable defects or other abnormal wear patterns.

In the case of warranty returns, brake designers and manufacturers test brake rotors to detect defects. Two characteristics representing potential defects include linear run out and thickness variation. Linear run out is the deviation of the brake rotor from straight-line, circular rotation, and includes both inbound and outbound run out. Thickness variation is the variation in thickness of the brake rotor and can occur where the brake surface is not consistently perpendicular with respect to the axis of rotation. This translates into run out when the rotor, caliper, and brake pads generate an uneven disc wear that produces two thin-to-high spots. Linear run out can also be the result of, for example, a warped brake rotor.

These rotor characteristics, whether from wear, manufacturing defects, or design defects, can produce pulsations in the brake system when brakes are applied, and therefore will cause a shuddering sensation in a braking motor vehicle. If a cause of an anomaly can be determined, these abnormal characteristics can be prevented. Therefore a large number of warranty returns can be avoided and a large amount of money can be saved.

Currently, brake rotors are initially inspected on the vehicle with a dial indicator. Measurements of rotor position and thickness are taken manually at various points around the rotor. When more in-depth testing is required, brake designers and manufacturers perform precision analysis of brake rotors in a laboratory environment. To accomplish this detailed lab testing, the brake rotors must be removed from the motor vehicle and shipped to the manufacturer, when the owner of the motor vehicle makes the warranty return. The transporting and testing of brake rotors is therefore an expensive, time consuming process. Additionally, dismounting and transporting the brake rotors can introduce additional defects (e.g. damage during shipment or corrosion of the rotor) and may result in analysis not representative of the on-vehicle behavior (e.g. because of the absence of lug nut torque).

For this and other reasons, improvements are desirable.

SUMMARY

In one aspect of the present disclosure, a system for determining a brake rotor characteristic is disclosed. The system includes test instrumentation that is installable on a motor vehicle. The test instrumentation includes at least one pair of linear variable displacement transducers. The linear variable displacement transducers are placed on opposing side surfaces of a brake rotor mounted on the motor vehicle, and oriented toward the brake rotor. The test instrumentation further includes a rotation detector oriented toward the brake rotor. The rotation detector determines when the brake rotor has completed a rotation. The test instrumentation further includes a brake test controller. The brake test controller is powered by a power source of the motor vehicle, such as a battery, with its own internal battery, or with an external power source such as normal 110V AC supply. The brake test controller is configured to acquire data from the at least one pair of linear variable displacement transducers and the rotation detector.

In another aspect of the present disclosure, a method of determining a brake rotor characteristic is disclosed. The method includes collecting data from at least one pair of linear variable displacement transducers regarding positional changes along an edge of the brake rotor during a predetermined number of rotations of the brake rotor. The method also includes analyzing the data to produce a test result representing the wear characteristic of the brake rotor.

In yet another aspect of the present disclosure, a computer-readable medium having computer executable instructions for performing a method of determining a brake rotor characteristic is disclosed. The computer-readable medium includes instructions for collecting data from at least one pair of linear variable displacement transducers. The computer-readable medium also includes instructions for analyzing the data to produce test results representative of a wear characteristic. The computer-readable medium further includes instructions for saving the test results in a handheld brake test controller and uploading the results from the handheld brake test controller to a remote computing system.

DETAILED DESCRIPTION

The present disclosure relates generally to measurement of a characteristic of a brake rotor on a motor vehicle. Specifically, the present disclosure describes a method and system for measuring a characteristic of a brake rotor that remains mounted on a motor vehicle. The system and method are discussed herein generally, followed by specific embodiments thereof.

According to a first aspect, a system for determining a characteristic is disclosed. Preferably, the system includes test instrumentation. The test instrumentation typically includes at least one pair of linear variable displacement transducers. The linear variable displacement transducers are placed on opposing side surfaces of a brake rotor that is mounted on the motor vehicle, and oriented toward the brake rotor. The test instrumentation can also include a rotation detector oriented toward the brake rotor. The rotation detector determines when the brake rotor has completed a rotation. The test instrumentation further includes a brake test controller, such as a handheld brake test controller. The handheld brake test controller can be powered by a power source of the motor vehicle, such as a battery, or by some other suitable means. Preferably, the handheld brake test controller is configured to acquire data from the at least one pair of linear variable displacement transducers and the rotation detector.

In another aspect of the present disclosure, a method of determining a characteristic is disclosed. The method includes installing test instrumentation on a motor vehicle. Preferably, the test instrumentation includes at least one pair of linear variable displacement transducers, a rotation detector, and a handheld brake test controller. The method further includes collecting data from the linear variable displacement transducers regarding positional changes along an edge of the brake rotor during a predetermined number of rotations of the brake rotor. The method also includes analyzing the data to produce a test result representing the wear characteristic of the brake rotor.

In yet another aspect of the present disclosure, a computer-readable medium having computer executable instructions for performing a method of determining a characteristic is disclosed. Preferably, the computer-readable medium includes instructions for collecting data from at least one pair of linear variable displacement transducers. The computer-readable medium also includes instructions for analyzing the data to produce test results representative of a characteristic. The computer-readable medium further includes instructions for saving the test results in a handheld brake test controller and can include uploading the results from the handheld brake test controller to a remote computing system.

Figure 1:
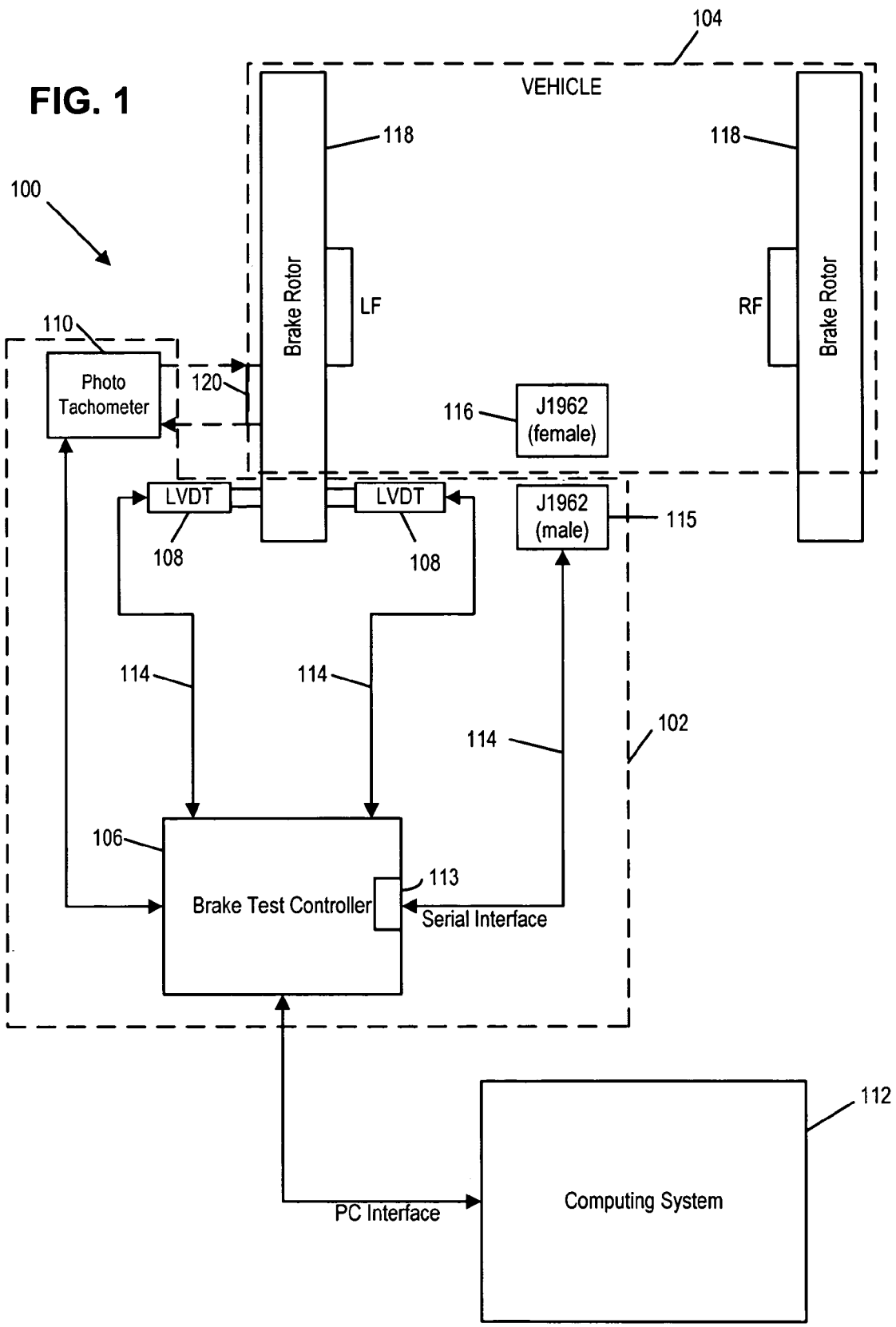
FIG. 1 is a block diagram of a system for determining a wear characteristic according to a possible embodiment of the present disclosure.

Referring now to FIG. 1, a block diagram of a system 100 for determining a characteristic, such as wear, is shown according to a possible embodiment of the present disclosure. In general, the system 100 includes test instrumentation 102 interfaced with a motor vehicle 104. Preferably, the test instrumentation 102 includes a brake test controller 106 that is preferably handheld, one or more linear variable displacement transducers 108, and a rotation detector, such as photo tachometer, 110. The system 100 can also include a remote computing system 112.

Preferably, the brake test controller 106 is a portable computing system, such as the system described below in conjunction with FIG. 2 or other suitable computing systems. In a preferred embodiment, the brake test controller 106 includes a pointing device, such as a mouse or touchpad, as described herein.

In another possible embodiment, the brake test controller 106 can include a touch screen display integrated into a portable housing. The touch screen display can include dedicated control and data regions such as described in conjunction with FIG. 5 below.

The brake test controller 106 can also include a number of communication connections 113, such as connections for serial data cables 114, which are connectable to the various other test instrumentation components. A serial cable 114 includes a J1962 connector 115 configured to interface with the complementary J1962 serial connection port 116 typically incorporated in the motor vehicle 104. The serial data bus, accessible through connection 113 to the J1962 serial connection port 116, includes power supply connections as well as communicative connections, providing access to the embedded computing systems contained within most motor vehicles. The J1962 serial connection port 116 provides communicative connection to both the onboard diagnostic and identification computing systems of the motor vehicle 104. The J1962 port 116 also provides an electrical connection to the vehicle's power source, such as a car battery. In this way, the brake test controller 106 can be powered by a power source of the motor vehicle 104. This eliminates the need for an external power source when testing brake rotors mounted on the motor vehicle 104. The communicative connections provided through the J1962 port 116 allow the brake test controller 106 to access a vehicle identification number stored within the internal circuitry of the motor vehicle 104.

The serial cables 114 further connect the brake test controller 106 to the one or more linear variable displacement transducers 108. A linear variable displacement transducer (LVDT) 108 is placed on each side of a selected brake rotor 118, that is attached to the motor vehicle 104, and interfaced with the brake rotor 118. LVDTs 108 are used in the system 100 to measure the displacement of the brake rotor 118 from straight line rotational movement.

LVDTs 108 typically consist of a movable ferrite material, a primary coil and two secondary coils. In operation, the shaft of the LVDT 108 is pressed against the rotor 118, and an AC magnetic field is introduced through the primary coil. In the centered position, the magnetic flux generated on the primary coil is coupled to the secondary coils. In this condition, the differential voltage measured across the secondary coils is zero. When the shaft is moved from its centered position, for example by a variation in the position of the brake rotor 118, more of the magnetic flux is coupled to one of the two secondary coils. This change in the amount of flux through the secondary coils results in a non-zero differential voltage.

The output voltage of the LVDT 108 is a function of the displacement of the ferrite core and is represented by a constant value within a specified range. The position of the shaft can be determined by the polarity and magnitude of the voltage.

By detecting the differential voltage of a LVDT 108 on both sides of the brake rotor 118 simultaneously, the brake test controller 106 can extrapolate the position of the LVDT 108 and therefore produce test results regarding the thickness variation and linear run out of the brake rotor 118 by comparing the thicknesses and positional data computed at each sampled point.

The brake test controller 106 can then use any of a number of interpolation methods to produce test results related to the thickness variation or linear run out at intermediate points between the sampled points. The test results can also include a graphical or numerical representation of the brake rotor 118 under analysis in the system 100.

The handheld brake test controller 106 is configured to sample the LVDT's 108 on each side of the brake rotor 118 many times per rotation of the brake rotor 118. For example, the brake test controller 106 could sample the LVDT's 108 5000 times per rotation, providing many samples per degree of rotation. This allows for a fine granularity of LVDT samples, providing a close estimation of the actual shape of the brake rotor 118.

The brake test controller 106 is further connected to a rotation detector 110 by a serial data cable 114. The rotation detector 110 can be, for example, a photo tachometer. The photo tachometer 110 emits a light signal and generates a pulse each time it detects a complementary reflected light signal. A reflective element, such as reflective tape 120 can be placed at a point on the brake rotor 118 or the wheel and tire assembly (not shown). The photo tachometer 110 is aligned with the reflective tape 120, such that the reflective tape passes across the light signal transmitted by the photo tachometer 110. Each rotation of the brake rotor 118 aligns the reflective tape 120 with the photo tachometer 110, producing a pulse from the photo tachometer 110 that can be detected by the brake test controller 106.

It is recognized that reflective elements other than reflective tape 120 will be effective at reflecting the light to the photo tachometer 110. Additionally, alternate rotation detectors, such as video sensing systems, could be used in place of the photo tachometer. It is also possible that rotations could be identified from data supplied by the motor vehicles embedded controllers via the J1962 serial port 115 and connector 116.

During the testing, data is collected during a predetermined number of rotations of the brake rotor 118. The rotations are detected by the rotation detector 110 and counted by the brake test controller 106.

Preferably, the brake test controller 106 is directly connected to the LVDTs 108 and the rotation detector 110. Thus, the brake test controller 106 is self contained, portable, and is a simplified and advantageous unit. It can be easily connected to determine a characteristic of a brake rotor without the need for multiple devices or more complexity and can be deployed right at the diagnostic facility for testing of brake rotors while still mounted on the vehicle.

Figure 2:
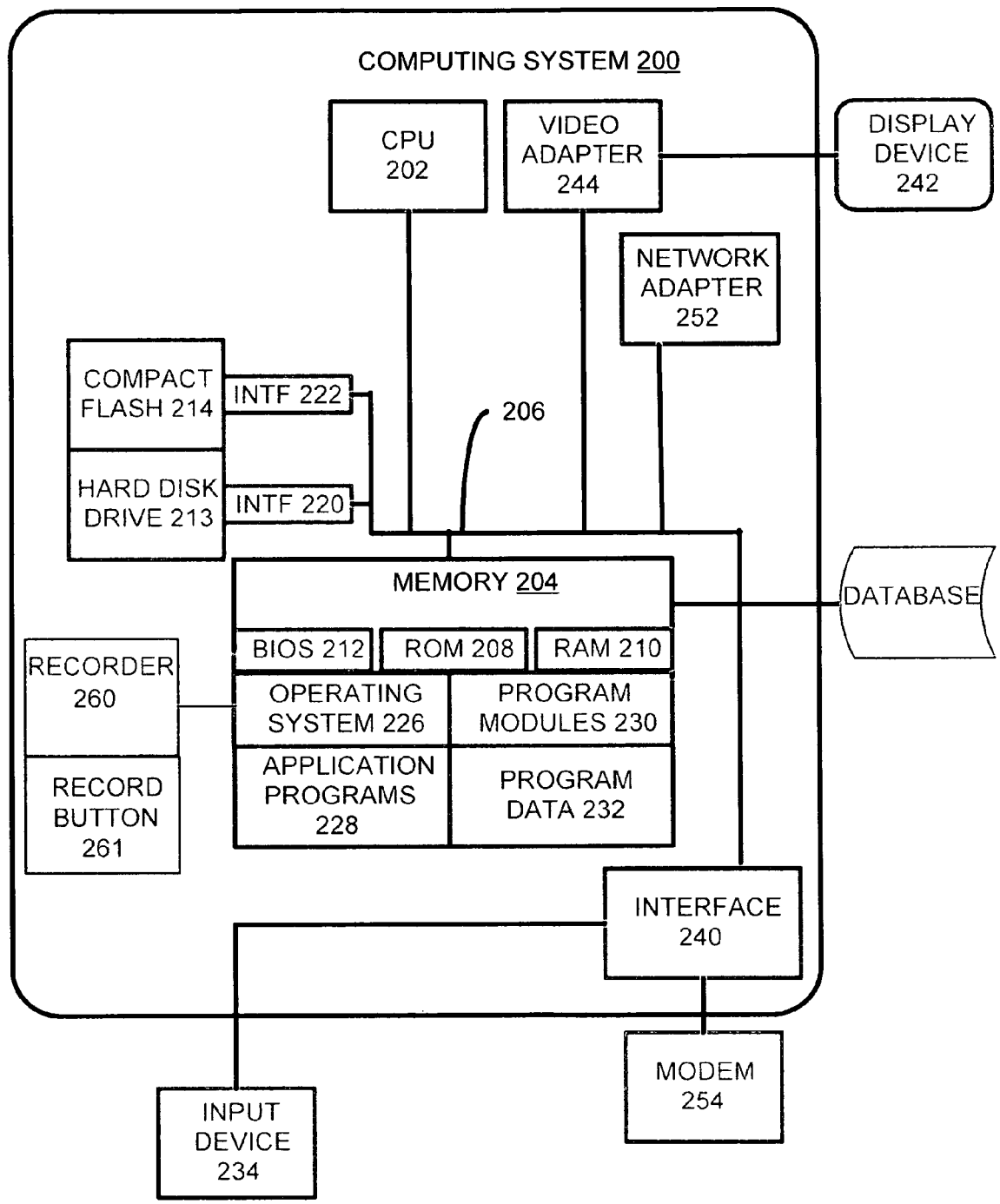
FIG. 2 is a schematic representation of a computing system that can be used to implement aspects of the present disclosure.

The brake test controller 106 can be communicatively interfaced with a remote computing system 112, such as the generalized computing system described in FIG. 2 or other suitable computing systems. In normal operation, the remote computing system 112 is located remotely from the brake test controller 106, for example at an engineering facility of a brake designer or manufacturer. This allows a brake designer to collect data or test results, at a single remote location, from multiple brake test controllers 106 at different locations for data analysis and comparison in order to detect a root cause determined from repeated brake rotor failures.

In such an embodiment, the interface between the remote computing system 112 and the brake test controller 106 can be a TCP/IP connection, such as a standard internet connection using an RJ-45 connection or fiberoptic connection or some other suitable connection. The brake test controller 106 and remote computing system 112 can be configured to include any of a number of alternate wired or wireless connections or internet connections.

By remote computing system, it is understood that the computing system need not be located in the car and is not constrained by a minimum or maximum distance from the brake test controller 106. In an alternative embodiment, the brake test controller 106, LVDTs 108, and remote computing system 112 described herein are located at an automotive repair shop. The remote computing system 112 can be connected to the brake test controller 106 by any of a number of wired or wireless connections including an RJ-45 connection, serial or parallel cable connection, infrared, RF connection, or other connection. In such a setup, the remote computing system 112 allows mechanics at the automotive repair shop to perform additional analysis of the brake rotor 118 or illustrate the wear characteristic to a customer in detail or color beyond what the brake test controller 106 can display.

Consistent with the present disclosure, the test instrumentation 102 that is to be located near the brake rotor 118 can be installed without removing the wheel or rotor from the motor vehicle 104. Alternately, the wheel can be removed to access the brake rotor 118.

Referring now to FIG. 2, an exemplary environment for implementing embodiments of the present invention includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and/or a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, digital camera, touch screen, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor or touch screen LCD panel, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
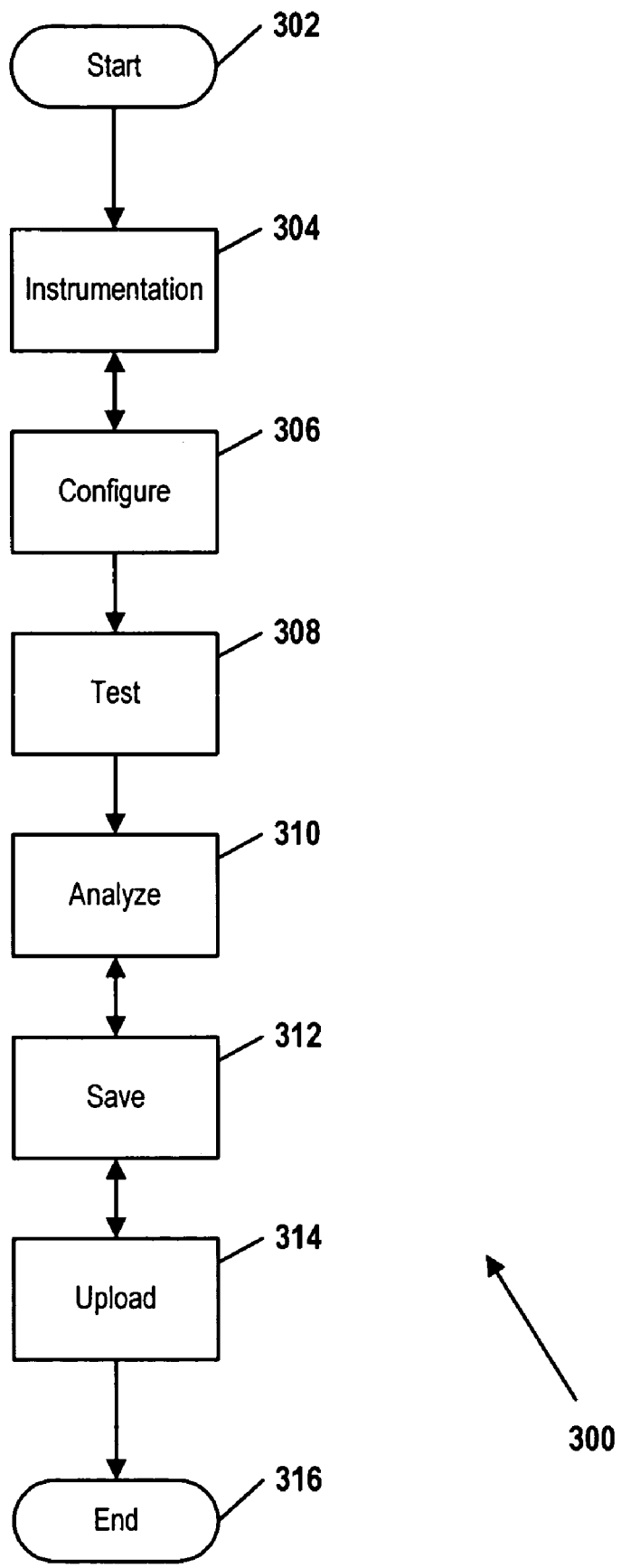
FIG. 3 is a block diagram of a system for determining a wear characteristic according to a possible embodiment of the present disclosure.

Now referring to FIG. 3, a block diagram of a system 300 for testing brake rotors, such as that described in connection with FIG. 1, is shown according to a possible embodiment of the present disclosure. The system 300 is instantiated by a start module 302. The system 300 includes an instrumentation module 304. The instrumentation module 304 provides for installation of test instrumentation in or on a motor vehicle. The motor vehicle can be, for example, a vehicle at a warranty repair center for brake rotor repair. The instrumentation module 304 adds test instrumentation to the motor vehicle. The test instrumentation can include a brake test controller, such as the brake test controller 106 of FIG. 1, at least one linear variable displacement transducer (LVDT), such as the LVDT 108 of FIG. 1, and a rotation detector, such as the rotation detector 110 of FIG. 1. The interconnections of these components with respect to the motor vehicle are discussed in further detail herein.

The system 300 includes a configure module 306. The configure module 306 sets one or more test parameters in the brake test controller. Test parameters, that can be set in preparation for a characteristic test, such as a wear characteristic, include the sampling frequency at which the brake test controller reads data from the LVDTs or the number of rotations of the rotor during the test.

The system 300 also includes a test module 308. The test module 308 performs a test to determine the characteristic of the brake rotor and collects data. The test module 308 uses the configured settings stored during execution of the configure module 306 and applies them accordingly. During execution of the test module 308, the system 300 collects a large number of samples from the LVDTs per rotation of the brake rotor to compile positional data of the brake rotor as it is rotated. Further, the test module 308 acquires samples for multiple rotations of the brake rotor. The samples are generally differential voltage readings from two LVDTs located on opposite sides of the rotor, the differential voltage values with the signal from a rotation detector represent the relative thickness and position of the brake rotor at the location where the sample is taken. In this way, the test module 308 can acquire LVDT measurements for a large number of sample points around the brake rotor and produce a robust data set of voltage values. Execution of the test module 308 is described in greater detail below in conjunction with the embodiment described in FIG. 4, below.

In the preferred embodiment, the test module 308 includes one or more software programs designed to automate the test of the brake rotor. The software programs preferably reside on a brake test controller, such as the one described above in conjunction with FIGS. 1–2.

The system 300 includes an analyze module 310. The analyze module 310 executes one or more operations on the data stored in the system 300 to produce test results. These operations can include calculations related to signal processing, filtering, and extrapolation techniques so as to determine the thickness variation and linear run out of the brake rotor. The calculations can also include interpolation techniques such as linear or polynomial interpolation to provide a graphical or numerical representation of the brake rotor tested.

In the preferred embodiment, the analyze module 310 includes one or more software programs designed to perform the calculations on the data measured from the LVDTs. The software programs preferably reside on a brake test controller, such as the one described above in conjunction with FIGS. 1–2. The software also includes functions to perform the calculations necessary to transform the differential voltage readings from the LVDTs to positional results and to extrapolate thickness variation and linear run out test results from those positional results. The software can also include functions to perform interpolation techniques such as a fast fourier transform, linear interpolation, or other known computerized interpolation methods.

The system 300 further includes a save module 312. The save module 312 stores the data in conjunction with identification of the motor vehicle and rotor from which the data was collected. For example, the data can be stored alongside a vehicle identification number (VIN) and wheel identifier (e.g. left front, right front, etc.) on a hard disk, such as that described in conjunction with FIG. 2. In the preferred embodiment, the save module 312 includes one or more software programs that preferably reside on a brake test controller, such as the one described above in conjunction with FIGS. 1–2.

The system 300 further includes an upload module 314. The upload module 314 transmits the data stored in the system 300 to a remote computing system, such as remote computing system 112 of FIG. 1, for further analysis. Use of another computing system for additional analysis allows the system 300 to be used for additional testing of other rotors while the additional analysis of the brake rotor results is completed.

In the preferred embodiment, the upload module 314 includes one or more software programs that preferably reside on a brake test controller, such as the one described above in conjunction with FIGS. 1–2. The software programs include communicative commands for transmitting data and/or test results from the handheld brake test controller to the remote computing system.

The system 300 is terminated by an end module 316.

A method consistent with the system as herein described is also contemplated by the present disclosure. In such a method, the modules comprise process steps that can be accomplished by using appropriate test hardware such as that disclosed in conjunction with FIGS. 1–2.

Figure 4:
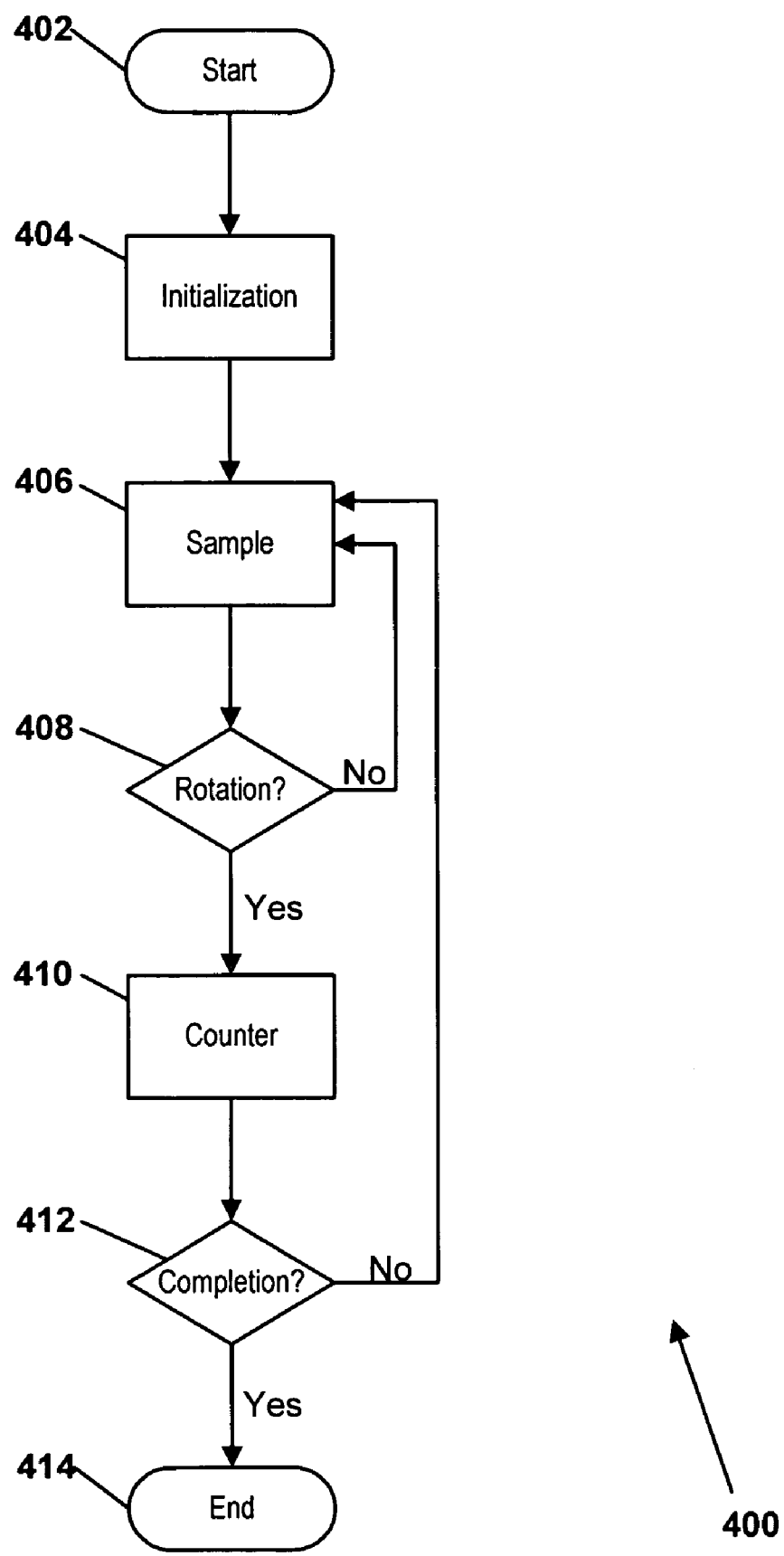
FIG. 4 is a flowchart of the data collection system according to a possible embodiment of the present disclosure.

Referring now to FIG. 4, a flowchart of a data collection system 400 is shown according to a possible embodiment of the present disclosure. Preferably, the system 400 is embodied at least partially in software residing on a brake test controller, such as the one described above in conjunction with FIG. 1. The data collection system 400 can be used as the test module of FIG. 3.

The system 400 is instantiated by a start operation 402.

The system 400 includes an initialization module 404. The initialization module 404 sets initial values for the system 400, such as initial and ending values for the number of rotations of a brake rotor, sampling frequency, and identification values such as a vehicle identification number and a wheel position for which a brake rotor is being tested. Preferably, a user can alter the ending value for the number of rotations. A user can also manually enter the vehicle identification number and the wheel position. Preferably, the vehicle identification number is accessed from the motor vehicle's onboard computing systems by the brake test controller, such as the brake test controller 106 of FIG. 1, e.g. through the J1962 connector interface.

The system 400 further includes a sample module 406. The sample module 406 reads the voltage level from the LVDTs, such as LVDT 108 of FIG. 1. This allows, for example, other portions of the system shown above in FIG. 1 to compute the displacement of the brake rotor based on the voltage reading from the LVDTs. Such computation can take place in the brake test controller.

The system 400 also includes a rotation determination operation 408. The rotation determination operation 408 determines if rotation has occurred. If the rotation determination operation 408 determines that a rotation has not yet occurred, operational flow branches "NO" to the sample module 406 and the sample module 408 is allowed to sample the voltage level from the LVDTs again.

If the revolution determination operation 408 determines that a rotation has occurred, operation flow branches "YES" to a counter module 410. The counter module 410 increments a counter that represents the number of rotations of the brake rotor that have been completed.

After the counter module 410 increments the counter, a completion determination operation 412 determines whether the predetermined number of rotations (as set in the initialization module, above) have been completed. If the completion determination operation 412 determines that less than all of the predetermined number of rotations has been completed, operational flow branches "NO" to the sample module 406 for sampling from the LVDTs. If the completion determination operation 412 determines that all of the predetermined number of rotations has been completed, operational flow branches "YES" to an end module 414 and operational flow halts.

One of skill in the art will recognize that a variety of sampling algorithms can be implemented according to the basic strategy described herein. For example, multiple samples can be acquired from the LVDTs before determining if a rotation has occurred. Such an embodiment can make more efficient use of the computing resources of the brake test controller if a large number of samples are reliably taken for each rotation of the brake rotor.

Figure 5:
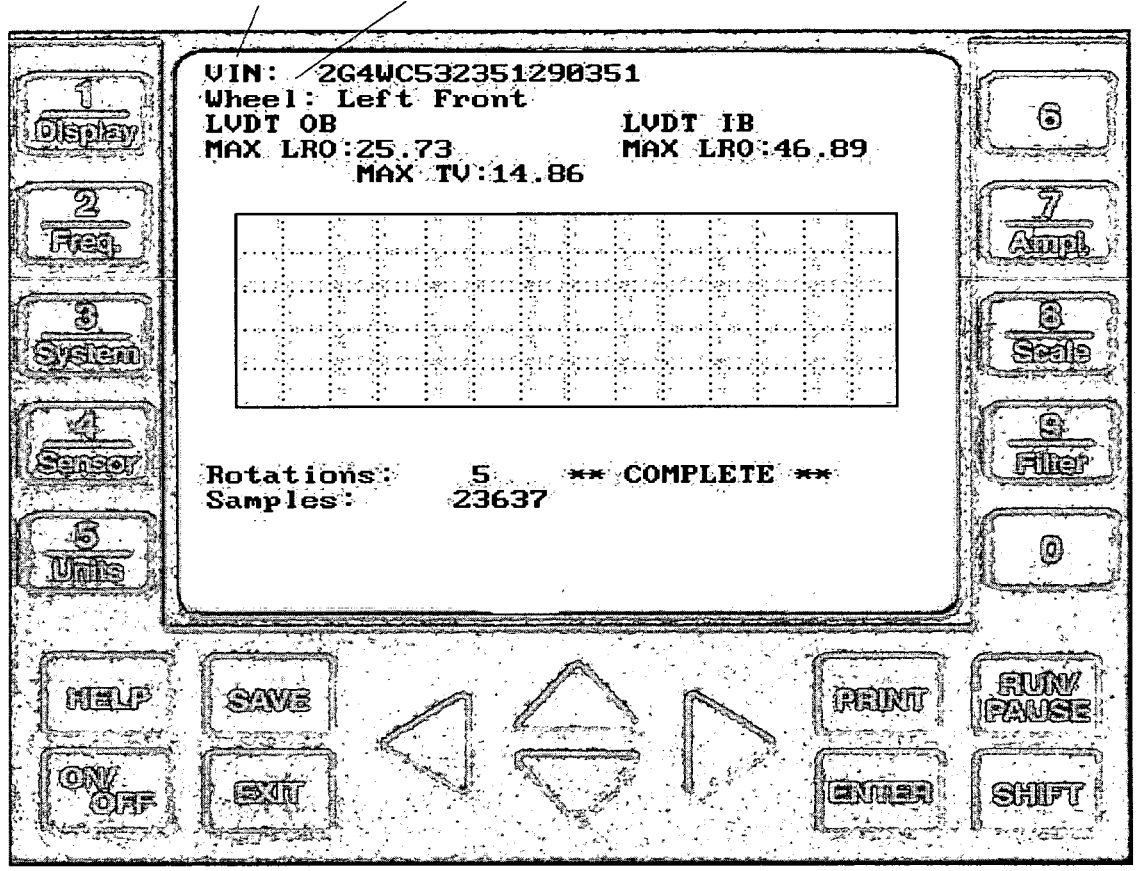
FIG. 5 is a graphical user interface for a handheld brake test controller according to a possible embodiment of the present disclosure.

Referring now to FIG. 5, a graphical user interface 500 for a brake test controller, such as the brake test controller 106 of FIG. 1, is shown according to a possible embodiment of the present disclosure. The graphical user interface 500 includes a dedicated control region 502 and a dedicated data region 504.

In general, the dedicated control region 502 includes a number of command buttons as illustrated. The command buttons shown can be touch screen commands, or can be selected by a mouse or other pointing device consistent with the description of the brake test controller described in connection with FIGS. 1–2.

The controls in the control region 502 can include arrows or other directional indicators. The controls can further include an on/off command, a save command, a run/pause command, an enter command, a shift command, a help command, an exit command, and a print command. The controls can further include numerical buttons. Of course, any other suitable controls can be included.

The dedicated data region 504 includes data of a variety of types and can include a vehicle information number 506 and a wheel position identifier 508. The vehicle information number can be manually entered into the brake test controller using the numerical buttons shown. The dedicated data region 504 can also display test results such as an inbound linear run out reading, an outbound linear run out reading. The dedicated data region 504 illustrated shows test parameters such as a rotations value and a samples value.

The graphical display area can be used, for example, to display a graphical representation of the brake rotor as tested to a user of the brake test controller, such as the brake test controller 106 of FIG. 1. Such functionality is particularly advantageous in brake shops and other warranty repair locations, as it allows the repair shop personnel to show the characteristic, such as wear, of the brake rotor to a customer.

Figure 6:
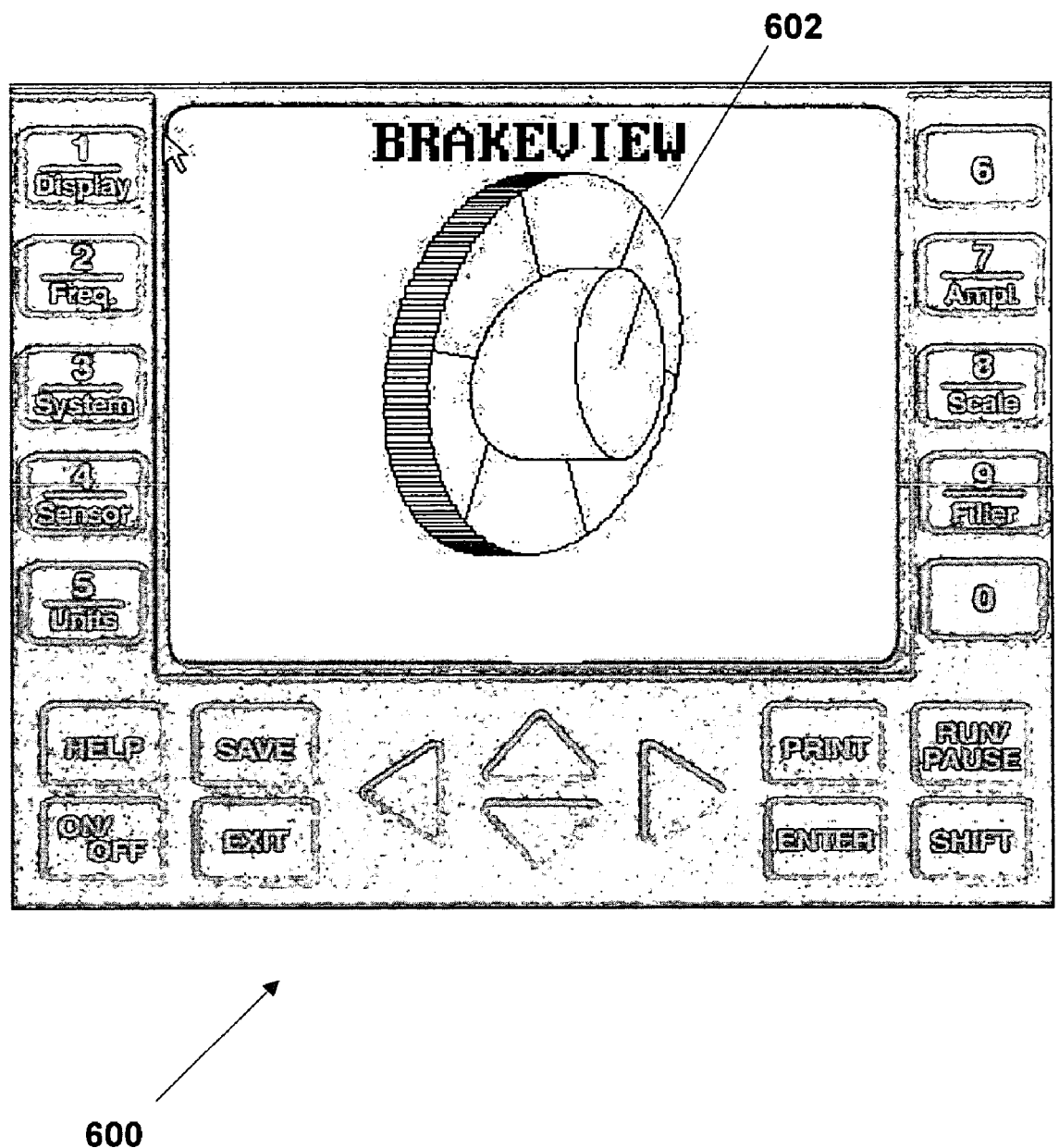
FIG. 6 is a graphical user interface for a handheld brake test controller according to a possible embodiment of the present disclosure.

Referring now to FIG. 6, graphical user interface 600 of the brake test controller is shown according to another possible embodiment of the present disclosure. The graphical user interface 600 presents a graphical representation 602 of a brake rotor tested according to the present disclosure.

The systems described above at least partially execute on and include a computing system, such as the one described in FIG. 2, and can include aspects implemented in a wide variety of programming languages, such as JAVA, C++, Pascal, COBOL, PERL, Visual BASIC, or other languages. Languages containing constructs allowing for handling of large quantities of data and quick computation are particularly useful for implementing aspects of the present disclosure, as data sets compiled from samples read from the brake rotor are usually sizable.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for determining a brake rotor characteristic comprising:
    test instrumentation including:
        at least one pair of linear variable displacement transducers, the transducers placed on opposing side surfaces of the brake rotor mounted on a motor vehicle and oriented toward the brake rotor;
        a rotation detector oriented toward the brake rotor, the rotation detector including a photo tachometer; and
        a brake test controller powered by a power source, the brake test controller configured to acquire and analyze data from the at least one pair of linear variable displacement transducers and the rotation detector to determine the characteristic.

2. The system of claim 1, wherein the brake test controller is connected to a serial communications port of the motor vehicle.

3. The system of claim 1, wherein the brake test controller is communicatively connected to an embedded computing system in the motor vehicle.

4. The system of claim 1, further comprising a remote computing system communicatively connected to the brake test controller.

5. The system of claim 1, wherein the rotation detector is operatively connected to the brake test controller such that a pulse is sent to the handheld brake test controller when the brake rotor completes a rotation.

6. The system of claim 1, wherein the brake test controller is configured to compute a test result representative of the characteristic.

7. The system of claim 6, wherein the remote computing system stores the data and the test result.

8. The system of claim 1, further comprising a remote computing system communicatively interfaced to the brake test controller.

9. The system of claim 1, wherein the brake test controller is handheld.

10. The system of claim 1, wherein the brake test controller is powered by a power source of the motor vehicle.

11. The system of claim 1, wherein the characteristic is a wear characteristic.

12. A computer-readable medium having computer executable instructions for performing a method of determining a brake rotor characteristic comprising:
    collecting data from at least one pair of linear variable displacement transducers placed on opposing side surfaces of a brake rotor mounted on a motor vehicle and oriented toward the brake rotor, the data comprising differential voltages representative of changes in position of the at least one pair of linear variable displacement transducers along an edge of the brake rotor during a predetermined number of rotations of a brake rotor attached to a motor vehicle;
    analyzing the data to produce test results representative of a wear characteristic of the brake rotor;
    saving the test results in a memory of a brake test controller;
    uploading the results from the brake test controller to a remote computing system;
    wherein saving includes associating the results with a vehicle identification number.

13. The computer-readable medium of claim 12, wherein analyzing includes computing a thickness variation of the brake rotor.

14. The computer-readable medium of claim 12, wherein analyzing includes computing an outbound linear run out of the brake rotor.

15. The computer-readable medium of claim 12, wherein analyzing includes computing an inbound linear run out of the brake rotor.

16. The computer readable medium of claim 12, wherein analyzing includes interpolating the data to produce a graphical representation of the brake rotor.

17. A system for determining a brake rotor characteristic comprising: test instrumentation including:
    at least one pair of linear variable displacement transducers, the transducers placed on opposing side surfaces of the brake rotor mounted on a motor vehicle and oriented toward the brake rotor;
    a rotation detector oriented toward the brake rotor; and
    a brake test controller powered by a power source, the brake test controller configured to acquire and analyze data from the at least one pair of linear variable displacement transducers and the rotation detector to determine the characteristic;
    wherein the rotation detector is operatively connected to the brake test controller such that a pulse is sent to the handheld brake test controller when the brake rotor completes a rotation.

18. A system for determining a brake rotor characteristic comprising: test instrumentation including:
    at least one pair of linear variable displacement transducers, the transducers placed on opposing side surfaces of the brake rotor mounted on a motor vehicle and oriented toward the brake rotor;
    a rotation detector oriented toward the brake rotor; and
    a handheld brake test controller powered by a power source, the handheld brake test controller configured to acquire and analyze data from the at least one pair of linear variable displacement transducers and the rotation detector to determine the characteristic.

* * * * *